A. W. SAVAGE.
PROCESS OF MAKING INNER TUBES FOR VEHICLE TIRES AND THE LIKE.
APPLICATION FILED MAR. 6, 1914.
1,138,250.  Patented May 4, 1915.
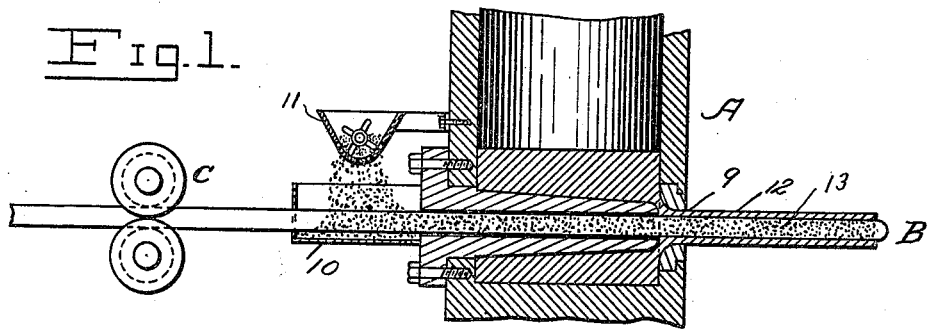
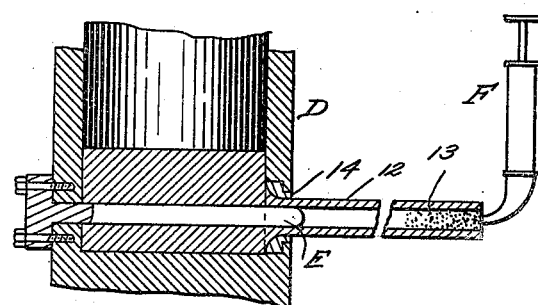
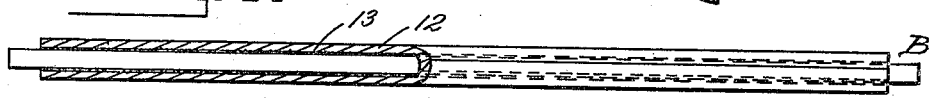
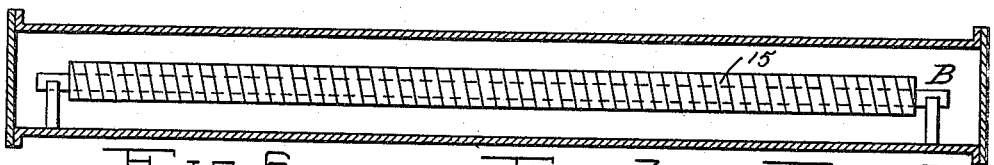
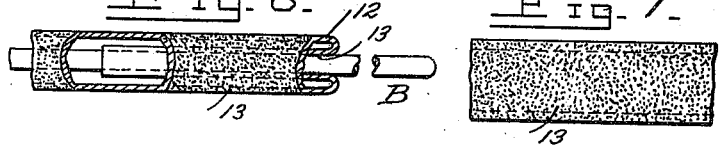
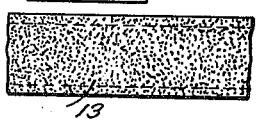
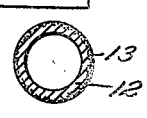
Witnesses;
H. Gearing.
Alfred H. Daehler.
Inventor,
Arthur W. Savage,
By Raymond — Blakeslee,
His Attorney.

UNITED STATES PATENT OFFICE.

ARTHUR W. SAVAGE, OF SAN DIEGO, CALIFORNIA.

PROCESS OF MAKING INNER TUBES FOR VEHICLE-TIRES AND THE LIKE.

1,138,250.   Specification of Letters Patent.   Patented May 4, 1915.

Application filed March 6, 1914.   Serial No. 822,928.

*To all whom it may concern:*

Be it known that I, ARTHUR W. SAVAGE, a citizen of the United States, residing at San Diego, in the county of San Diego and State of California, have invented a new and useful Process of Making Inner Tubes for Vehicle-Tires and the like, of which the following is a specification.

This invention relates to an improved process for making inner tubes for vehicle tires, and the like; and it has for its object to provide a new and useful process for this purpose whereby a tube is produced having many advantages over tubes produced otherwise, and in the carrying on of which process many advantages will arise pertinent to the proper production and development of the tube and the facilitation of its formation and handling.

Although the present invention particularly relates to processes for making inner rubber tubes for pneumatic vehicle tires, it will be manifest that in accordance with its steps and novel features other structurally similar products may be made, and particularly other tubular rubber products. In the manufacture of such tubes, the rubber stock is usually either forced through a suitable opening on to or over or around a mandrel, or massed around a mandrel, whereupon it is bandaged and then vulcanized. The rubber frequently sticks to the mandrel and renders the withdrawal of the vulcanized tube difficult. At other times, the mandrel is omitted, and the tube frequently collapses during formation or vulcanization whereupon the inner walls of the tube become adhered. In accordance with the present invention, these objectionable conditions of adhesion are eliminated. In practising the present invention, at the same time, a tube or final product is produced which has an outer surface portion so altered or constituted, by the addition of a suitable carbon, such as graphite, to the rubber substance, that a working or wearing surface of extreme smoothness and durability is provided. This is of high importance in the use of rubber inner tubes for vehicle wheels, as the provision of a smooth, slick surface upon the same eliminates the damage and deterioration resulting from frictional engagement of the outer surface of the tube with the shoe or casing or the like portion of the tire, and the consequent abrasion of the inner tube.

In the red rubber compounds sulfuret of antimony is used to render the rubber compound tough, and the resultant red rubber has become famous on account of its many good qualities. But chemical reaction soon causes deterioration in red rubber goods, made in accordance with standard processes, and when the red color fades into pink, red rubber goods are said to "bloom" and are usually returned to the manufacturer as worthless, this deterioration causing endless trouble.

It is one object of this invention to forestall any such deterioration and fading by making the red rubber tubes or the like, as well as other rubber tubes, in accordance with the method herein disclosed.

The accompanying drawing illustrates steps which may be employed in the carrying on of the process constituting the present invention, and illustrates the final product of such process.

In such drawing: Figure 1 is a fragmentary sectional elevation of a portion of a press and mandrel for use in practising the invention, means likewise being shown for applying pulverulent carbon, such as graphite, to the mandrel, prior to the application of the rubber thereto; Fig. 2 is a similar view illustrating the practice of the invention with omission of this mandrel feature; Fig. 3 is a fragmentary view showing the mandrel removed from the press and the rubber tube thereon with the graphite between the same and the mandrel; Fig. 4 is a side elevation of the rubber construction and provision of features shown in Fig. 3, with the further illustration of the mode of application of the bandage which is applied to the tube prior to vulcanizing same; Fig. 5 is a similar view showing the completely bandaged tube on the mandrel and supported in a vulcanizing chamber; Fig. 6 is a view illustrating the method of withdrawing the vulcanized tube from the mandrel, by reversing the tube upon itself, whereby the prior inner surface of the tube, treated with graphite, becomes the outer surface; Fig. 7 is an enlarged fragmentary view of a portion of the completed tube; and, Fig. 8 is a transverse sectional view of the same.

Referring now to the drawing and the several features thereof, for purposes of illustrating and describing the steps of the new process, A in Fig. 1 designates the press through which the stock rubber is squeezed over and on to a mandrel B advanced by suitable mechanism, fragmentarily illustrated at C, the mandrel passing centrally through a relatively larger opening 9 through which the rubber is expressed and laid on to the mandrel. Prior to entering the press, the mandrel traverses a box 10 within which it receives a powdering of graphite or the like fed from a shaker or hopper 11. Thus, when the rubber substance, 12, is forced down on to and around the mandrel, it comes into direct contact with the particles of the pulverulent or finely divided carbon, such as graphite or the like, 13. In Fig. 2 a similar press D is shown with its opening 14 through which the rubber mass 12 is forced out over a fixed mandrel E. In order to prevent the walls of the tube 12, in Fig. 2, from becoming adhered upon collapsion of the tube, pulverulent carbon, such as graphite 13, is jetted or blown into the forming tube, from a pump, injector, or other applicator F. The tube 12, shown in Fig. 2, upon its completion is hung up or otherwise supported for vulcanizing, having a material coating of the graphite 13 upon its inner surface. The tube 12, shown in Fig. 1, upon its completion, is spaced from the mandrel B by material coating of the carbon 13, and, provided with suitable bandages 15, as shown in Fig. 4, is then put into a vulcanizing chamber F, where it is supported by the ends of the mandrel B. After being vulcanized, each of the tubes 12, no matter how formed, is reversed or turned inside out. When the tube is formed without the mandrel B, the inner surface of which tube has been prevented from adhering by the graphite B, the tube is readily reversed upon itself. The tube 12 formed with the mandrel B is turned inside out upon the mandrel, as illustrated in Fig. 6, and thus removed from the mandrel, the graphite 13 preventing the inner surface from adhering to the mandrel. The inner surfaces of the tubes formed in both manners described now become the outer surfaces, and it is found that the vulcanizing process has caused the graphite coating to become thoroughly and intimately associated with the rubber tube structure, so that a smooth and slick outer carbon or graphite surface is provided. This surface co-acts with the engaging surface of the shoe or casing of the tire, so as to prevent abrasion or friction, and thus prolongs the life of the tube and increases its efficiency and conserves its strength and life.

When the mandrel B is used, and is maintained within the tube during the vulcanizing step, the pressure of the bandage 15 upon the tube causes the carbon to become more intimately connected or associated with the rubber structure; in fact, it causes the pulverulent carbon to penetrate the rubber substance and produce a final outer carbonized or carbon skin or case, the toughness and smoothness of which are highly effective and useful for the purposes above pointed out.

Instead of applying the finely divided carbon or the like to the tube between the same and the mandrel, or within the tube, and then vulcanizing the tube and reversing it upon the mandrel or upon itself, the graphite or the like may be sprinkled upon or applied to the tube after it is placed upon or built upon the mandrel, and exteriorly of the tube, and prior to the vulcanizing step. The bandages are then applied, and the pulverulent carbon or the like is caused to penetrate the rubber substance and produce an outer tough and smooth skin or case in the same manner as the skin or case may, as above set forth, be produced first within the tube and then be caused to constitute the outer surface of the tube upon the reversal of the latter or the turning of the same inside out. In accordance with this method of practising the invention the carbon, of course, does not assist in preventing the tube from sticking to the mandrel.

It will be seen that the invention not only much improves the manufacturing of vehicle tire inner tubes and the like, but enables the production of such inner tubes and the like as are of highly increased efficiency and serviceability and generally preferable over tubes otherwise produced.

The chemical reaction which usually causes rapid deterioration of tubes made of red rubber compounds does not occur in tubes made of red rubber compounds when manufactured in accordance with the improved method herein disclosed. The life of the tubes is thus greatly lengthened.

It is manifest that the graphite or other carbon may be applied as a paste or in flake form, in which case the applicator for the same would be suitably varied from the corresponding means shown in the drawing.

It is manifest that many variations may be made from the disclosures of the foregoing description and of the drawing, with respect to the means employed and in the specific acts incident to the carrying on of the process; and all without departing from a fair interpretation of the invention.

Having thus disclosed my invention, I claim and desire to secure by Letters Patent:

1. The process of making a rubber tube, consisting in applying carbon to the inner surface of the tube before vulcanizing, then vulcanizing the tube under pressure and finally reversing the tube so that the inner surface becomes the outer surface thereof.

2. The process of making a rubber tube, consisting in applying the rubber stock to a mandrel or the like having a carbon coating, then vulcanizing the tube upon the mandrel under pressure, and then reversing the tube so that the inner surface becomes the outer surface thereof.

3. The process of making a rubber tube, consisting in applying the rubber stock to a mandrel or the like having a carbon coating, then vulcanizing the tube upon the mandrel under bandage pressure, and then reversing the tube so that the inner surface becomes the outer surface thereof.

4. The process of making a rubber tube, consisting in applying the rubber stock to a mandrel or the like having a carbon coating, then vulcanizing the tube upon the mandrel under bandage pressure, and then reversing the tube upon the mandrel so that the inner surface becomes the outer surface thereof.

5. The process of making a rubber tube, consisting in applying carbon to the surface of the tube before vulcanizing, and then vulcanizing the tube under pressure whereby the carbon becomes intimately associated with the tube to form a permanent case upon the same.

6. The process of making a rubber tube, consisting in applying carbon to the surface of the tube before vulcanizing, and then vulcanizing the tube under mechanical pressure whereby the carbon becomes intimately associated with and forced into the tube to form a permanent case upon the same.

7. The process of making a rubber tube, consisting in applying carbon to the surface of the tube before vulcanizing, then vulcanizing the tube under mechanical pressure whereby the carbon becomes intimately associated with and forced into the tube to form a permanent case upon the same, and finally reversing the tube upon itself.

In testimony whereof, I have signed my name to this specification in the presence of two subscribing witnesses.

ARTHUR W. SAVAGE.

Witnesses:
  HAROLD VON BRIESEN,
  R. R. ECKERT.